Inventors
HENRY L. OLSON
AND
HENRY J. FREEZE
By Carwell & Lagaard
ATTORNEYS

Dec. 23, 1952 — H. L. OLSON ET AL — 2,622,505
ELECTRIC BREAD TOASTER
Filed Feb. 4, 1950 — 5 Sheets-Sheet 4

Inventors
HENRY L. OLSON
AND
HENRY J. FREEZE
By Caswell & Lagaard
ATTORNEYS

Dec. 23, 1952 H. L. OLSON ET AL 2,622,505
ELECTRIC BREAD TOASTER

Filed Feb. 4, 1950 5 Sheets-Sheet 5

Inventors
HENRY L. OLSON
AND
HENRY J. FREEZE
By Caswell & Lagaard
ATTORNEYS

Patented Dec. 23, 1952

2,622,505

UNITED STATES PATENT OFFICE 2,622,505

ELECTRIC BREAD TOASTER

Henry L. Olson, Grand Haven, and Henry J. Freeze, Ferrysburg, Mich., assignors to Camfield Manufacturing Company, Grand Haven, Mich., a corporation of Michigan Application February 4, 1950, Serial No. 142,366

4 Claims. (Cl. 99—391)

1

The herein disclosed invention has for an object to provide a bread toaster in which the toaster may be operated from either end thereof.

Another object of the invention resides in providing a toaster having spaced heating elements forming two bread ovens provided with bread racks therein movable in an up and down direction and in further forming a space therebetween in which part of the supporting and operating mechanism for the bread racks is disposed.

An object of the invention resides in providing a frame for supporting the heating elements and bread racks and having first and second end frame members and in providing attaching means for connecting the bread racks together.

A still further object of the invention resides in pivoting said attaching means to parallel levers extending through one of the said end frame members and disposed in said space and in further providing pivots for said levers at the other ends thereof carried by one of said end frame members.

An object of the invention resides in providing first and second crossed operating levers disposed in said space and in pivoting said first operating lever to said first end frame member and said second operating lever to said second end frame member.

Another object of the invention resides in providing a sliding connection between said crossed levers whereby downward movement of one lever will cause corresponding movement of the other lever.

Another object of the invention resides in providing a link between one of said parallel levers and one of said crossed levers.

Another object of the invention resides in connecting the link to said parallel lever at a locality between the center of said lever and its pivot and in further connecting said link to said operating lever at a point between the sliding connection and the free end thereof.

Other objects of the invention reside in the novel combination and arrangement of parts and in the details of construction hereinafter illustrated and/or described.

2

Figure 4:
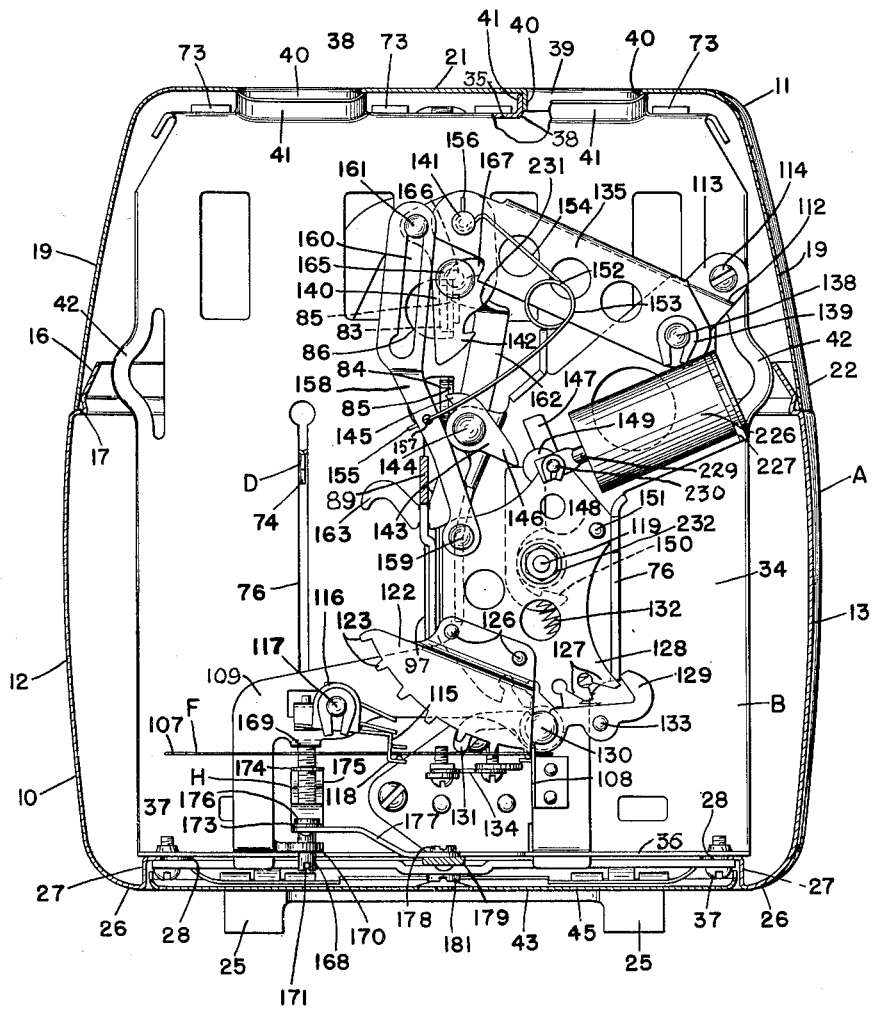
Fig. 4 is another cross sectional view taken on line 4—4 of Fig. 1.
Figure 5:
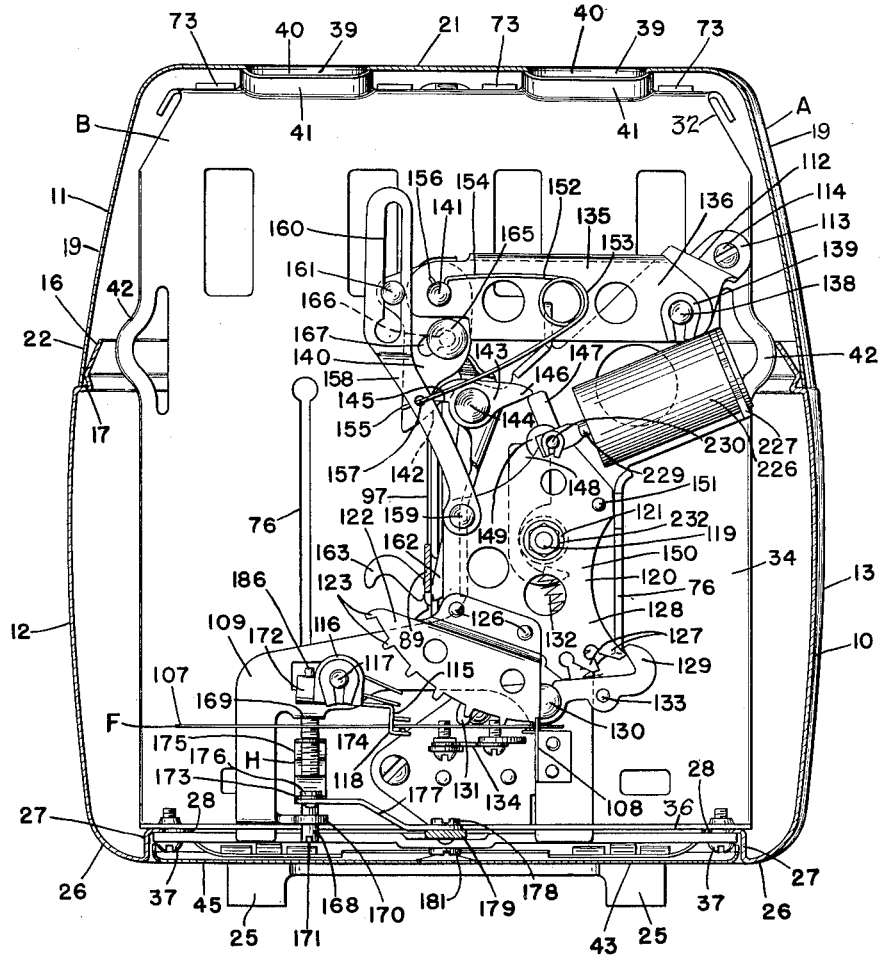

Fig. 5 is a view similar to Fig. 4 showing the parts in altered position.

The bread toaster disclosed herein consists of a case A in which is disposed a framework B. This framework includes two spaced end frame members. A number of heating elements disposed within the framework B form two spaced bread ovens C and provides a space therebetween. In the bread ovens C are disposed two vertical movable bread racks D which support the bread and which are spring biased to non-toasting position. These bread racks extend through one of said end frame members and are connected together exteriorly thereof through suitable attaching means. For operating the bread racks, operating mechanism E is employed which consists of two parallel levers pivoted at one end of each lever to said attaching means and pivoted at the other end of each lever to one of said end frame members. These levers cause parallel movement of the bread racks D within the bread ovens C. Below the said parallel levers are provided two crossed operating levers, one operating lever being pivoted to one end frame member and the other operating lever being pivoted to the other frame member. A sliding connection between these operating levers causes downward movement of one lever upon corresponding movement of the other lever. A link extending between one of said crossed operating levers and one of said parallel levers serves to cause downward movement of the bread racks upon downward movement of either of said operating levers. The pivot for said link to said parallel lever is situated intermediate the center of said lever and its pivot to the frame. The pivot for said link to said operating lever is situated between said sliding connection and the free end of said lever whereby multiplication of movement is procured causing greater movement of the bread racks than the free ends of the operating levers. Actuation of the toaster is procured through a timing device F. This timing device controls a switch mechanism G by means of which the heating elements are energized. A color control device H operable from either end of the toaster serves to regulate the color of the toast. These various parts will now be described in detail.

Figure 1:
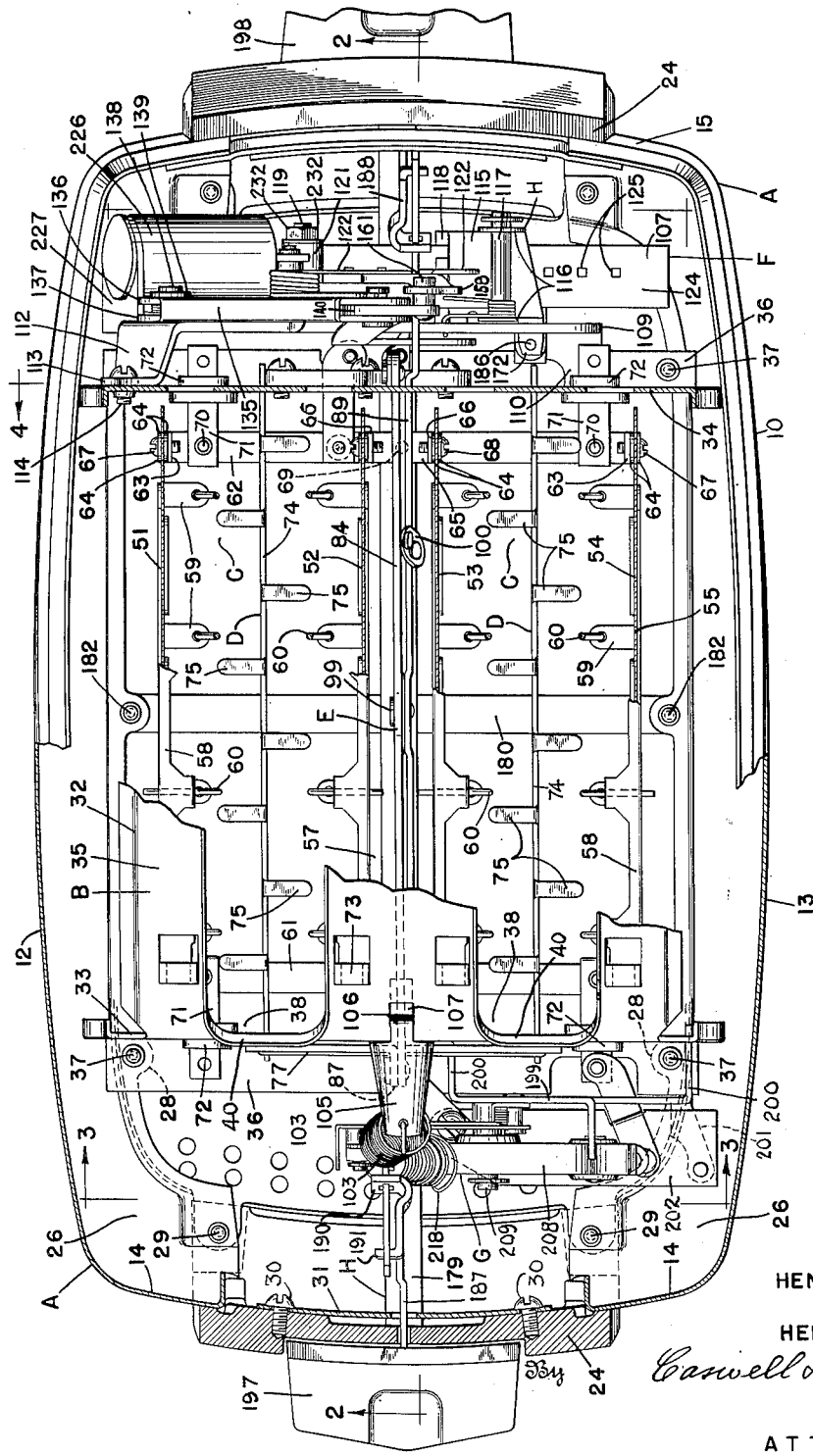
Fig. 1 is a plan sectional view of a toaster illustrating an embodiment of the invention and taken substantially on line 1—1 of Fig. 2.
Figure 2:
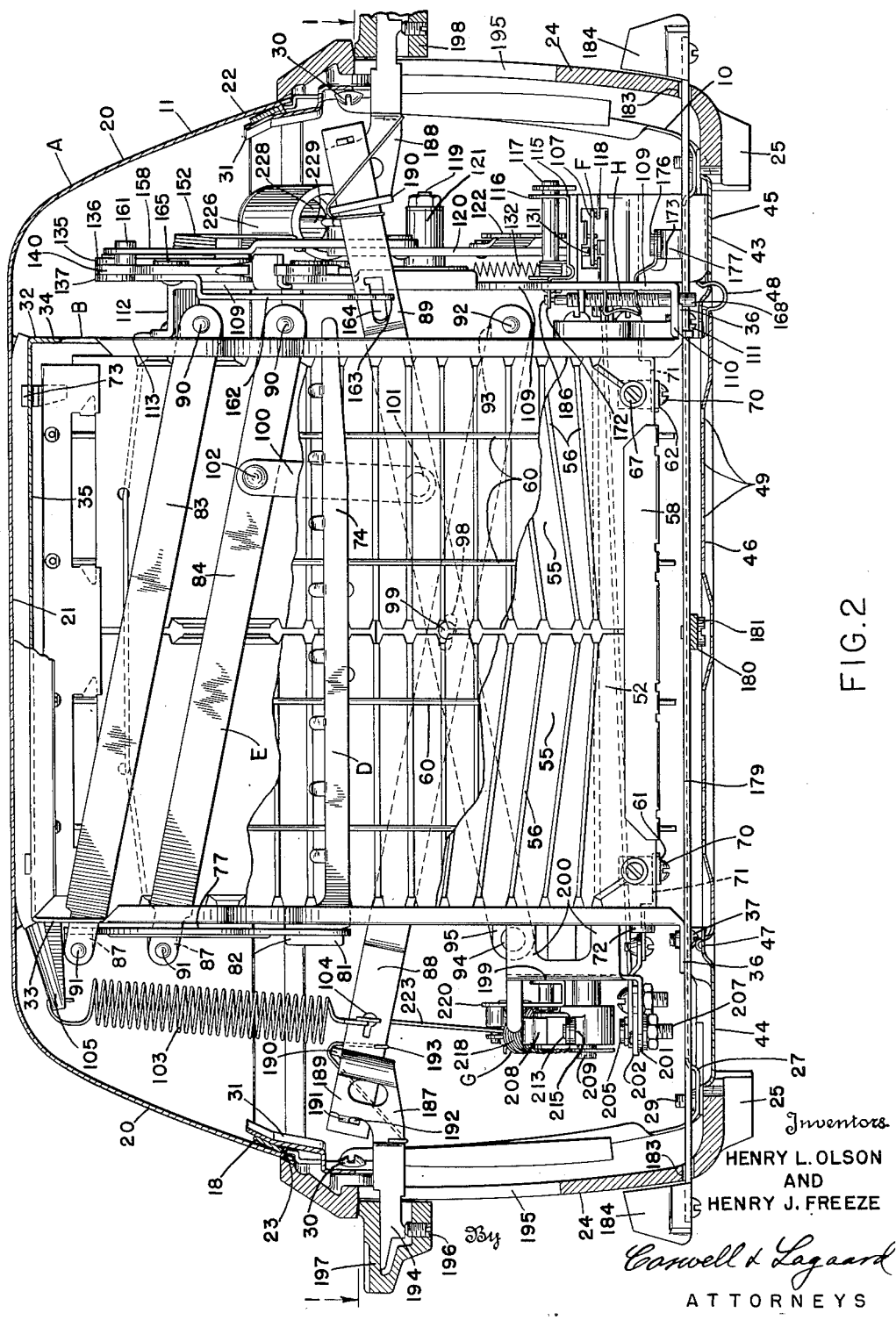
Fig. 2 is an elevational sectional view taken on line 2—2 of Fig. 1.

The case A of the invention, shown in detail in Figs. 1, 2 and 4, consists of a lower case section 10 and an upper case section 11. Case section 10 has sides 12 and 13 and which have formed on them inwardly turned end portions 14 and 15 best shown in Fig. 1. The sides 12 and 13 and end portions 14 and 15 are formed with an offset 16 which provides a recess 17 extending about the uppermost portion of said case section. A bar 18 is secured to the offsets 16 of the end portions 14 and tie the parts of the lower case section together. This bar may be welded, brazed, or otherwise secured to the said offset whereby the parts are securely held attached to one another. The upper case section 11 is dome-shaped in form having sides 19, ends 20 and a top 21. The lower marginal portions 22 of the upper section 11 is received in the recess 17. For holding the parts together the marginal portion 22 of the ends 20 are formed with inwardly turned lips 23 which are adapted to snap under the bars 18. The bars 18 are arranged in inclined relation so that when the upper case section is forced downward the lips 23 are sprung apart. When the said lips pass beneath the lower edges of the bars 18 the said lips again spring in position and hold the parts assembled.

For closing the ends of the lower case section 10, end pieces 24 are employed which are constructed from a plastic material. The lowermost portion of the sides 12 and 13 and the end portions 14 and 15 are turned inwardly as indicated at 26. These portions of the case section have upwardly extending flanges 27 which terminate in a number of horizontally disposed ears 28. The end pieces 24 are formed with feet 25 which underlie the ears 28 of the side 12 and 13. Screws 29 extend through these feet and are screwed into said ears. Other screws 30 extend through a clip 31 and are screwed into the end pieces 24. These clips engage the bars 18 and hold the uppermost portions of the end pieces attached to the case proper.

The framework B includes a frame 32 of inverted U-shape having end frame members 33 and 34 and an upper frame member 35 connected therewith. The frame members 33 and 34 have flanges 36 which overlie certain of the ears 28. Screws 37 pass through these ears and are screwed into the flanges 36 and serve to attach the lowermost portion of the frame to the case proper. The upper frame member 35 of frame 32 has openings 38 formed therein which communicate with the bread ovens C. These openings communicate with other openings 39 in the top 21 of the upper case section 11. Depending flanges 40 formed on the top 21 of case section 11 extend downwardly into and are received in similar flanges 41 formed at the upper frame member 35 of frame B. For the purpose of centering the case A with respect to the frame 32 at the locality of the joint between the two frame sections, projections 42 are formed in the end frame members 33 and 34 and which are adapted to engage the offset 16 formed on the lower case section 10 as best shown in Fig. 4.

The lowermost portion of the toaster is closed by means of a bottom 43. This bottom consists of two end portions 44 and 45 and an intermediate closure 46. The closure 46 is hingedly connected to the end portion 44 through a hinge 47 and is detachably secured to the end portion 45 by means of a spring clip 48. This closure is provided with openings 49 which give the desired amount of draft to the toaster. The end portions 44 and 45 are held attached to the case A by means of the screws 29 and 37 previously referred to.

The bread ovens C are formed by the end frame members 33 and 34 of frame 32 and by means of four heating elements 51, 52, 53 and 54. These elements consist of sheets of mica 55 on which are wound suitable resistors 56. The heating elements 52 and 53 are separated from one another to form a space 57 therebetween and in which portions of the mechanism E for operating the toaster is disposed.

The heating elements 51, 52, 53 and 54 have reinforcing strips 58 secured to the same at the top and bottom thereof. These reinforcing strips have ears 59 projecting outwardly therefrom and into the bread ovens C. Guard wires 60 are attached to these ears and extend into the bread ovens C and hold the bread spaced from the heating elements to prevent burning of the bread.

The heating elements of the invention are supported in the following manner: Extending beneath the heating elements at the ends thereof are two bars 61 and 62 which are constructed and supported in the same manner. Only the bar 62 has been shown in detail and will be described. This bar has upstanding flanges 63 at the ends of the same and which are threaded to receive screws 67. The screws 67 pass through the sheets of mica 55 and are screwed into the said flanges. Washers 64 disposed on each side of the mica serve the usual purpose. In the center of the bar 62 is a channel-shaped support 65 which has flanges 66 similar to the flanges 63 extending upwardly therefrom. Screws 68 similar to the screws 67 extend through the sheets of mica of the heating elements 52 and 53 and attach the same to the bar 62. The support 65 is attached to the bar 62 by means of a screw 69 which extends through said bar and is screwed into the support 65. The bars 62 have attached to them by means of screws 70, arms 71 which project through insulators 72, mounted in the end frame members 33 and 34. The upper ends of the heating elements 51, 52, 53 and 54 are held in place by means of insulators 73 which are mounted in the upper frame member 35.

Figure 3:
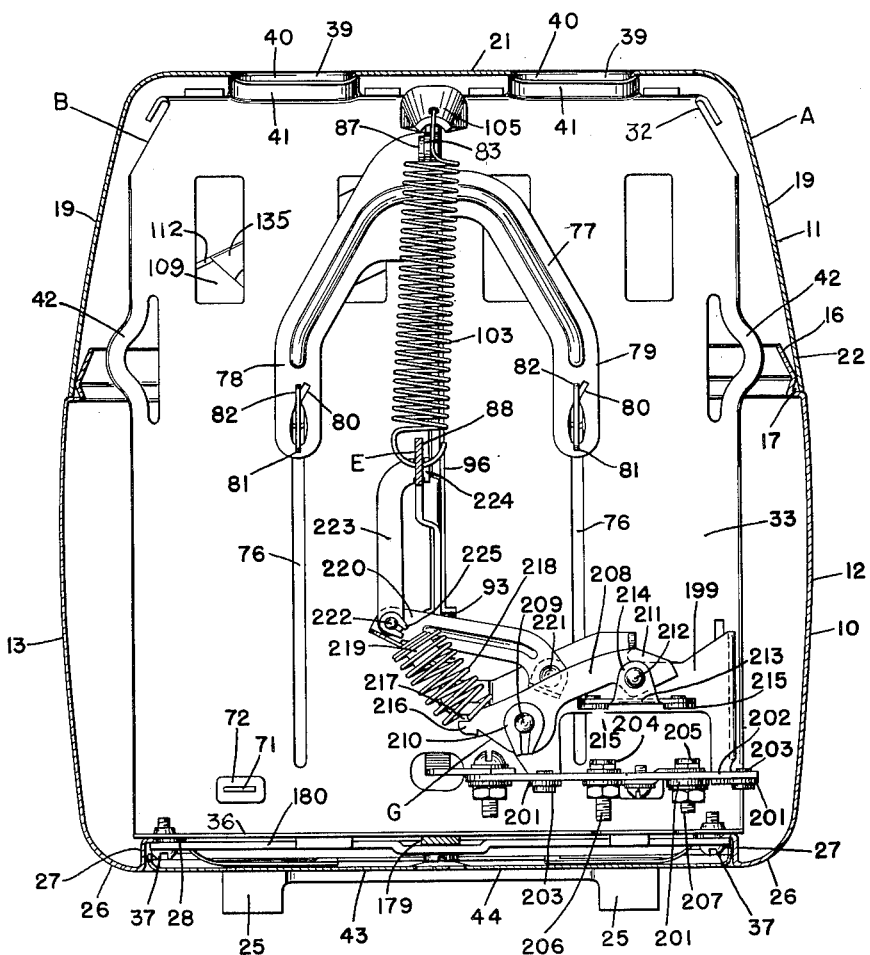
Fig. 3 is a cross sectional view taken on line 3—3 of Fig. 1.

The bread racks D are used in supporting the bread within the bread ovens C and are both identical in construction. These bread racks are each constructed from a bar 74 of metal having lugs 75 projecting outwardly therefrom, the alternating lugs extending in opposite directions. The said bars extend through slots 76 in the end frame members 33 and 34. For supporting the said bread racks the following construction is employed: Disposed exteriorly of the end frame member 34 is a yoke 77 of metal having two arms 78 and 79. These arms have slots 80 in the same and which are angular in form. The ends 81 of the bars 74 project through these slots. These ends 81 have fingers 82 formed on the same and which are normally bent to correspond with the angularity of the slots 80. After the parts have been assembled the said fingers are straightened out as shown in Fig. 3 and the bread racks D become rigidly supported on the yoke 77.

The operating mechanism E of the invention includes two parallel levers 83 and 84. These levers are pivoted by means of rivets 90 to lugs 85 best shown in Fig. 4. These lugs are formed by striking the metal out of the end frame member 34 to leave openings 86 in said end frame member and through which the levers 83 and 84 extend. The other ends of said levers are pivoted by means of rivets 91 to lugs 87 formed on the yoke 77. By means of this construction the two bread racks D are guided for up and down movement upon swinging of the levers 83 and 84 and during such movement maintained in horizontal position.

The operating mechanism E further includes two crossed operating levers 88 and 89. The lever 88 is pivoted by means of a rivet 92 to a lug 93 formed on the end frame member 34. The other lever 89 is pivoted by means of a rivet 94 to a lug 95 formed on the end frame member 33. The two levers 83 and 89 and the levers 83 and 84 travel in a vertical slot 96 formed in the end frame member 33 while the lever 89 travels in a slot 97 formed in the end frame member 34. The lever 88 has a slot 98 in the same extending longitudinally thereof and located at the portion of the same where the lever 89 crosses the lever 88. Attached to the lever 89 is a pintle 99 which is received in the slot 98. It will readily be comprehended that by means of this construction the two levers are caused to move in unison and upon depressing either of said levers the other lever moves with it and in the same direction. The lever 89 is connected by means of a rivet 101 to a link 100. Link 100 is connected by means of a rivet 102 to the lever 84. It will be noted that the rivet 102 is disposed intermediate the center of the lever 84 and the pivot 90 while the rivet 101 is disposed intermediate the pintle 99 and the free end of the lever 89. By means of this construction a lever advantage is gained so that the levers 83 and 84 together with the bread racks D travel a greater distance than the levers 88 and 89.

The operating mechanism is urged to move the bread racks D into non-toasting position. This is accomplished by means of a tension coil spring 103 which is hooked into a hole 104 in the lever 88 and which is further hooked on a bracket 105 issuing outwardly from the end frame member 33. The said bracket has a hook 106 which is hooked into a hole 107 in the upper frame member 35 of frame 32.

The timing mechanism F of the invention is of the type disclosed in the patent to R. Sardeson 2,365,909 issued December 26, 1944. This timing mechanism includes a strip of bimetal 107 which is mounted for reciprocating movement in a guide 108. This guide is in the form of a bracket which is attached to an end plate 109 forming part of the framework B. The end plate 109 has a foot 110 which rests upon and is attached to the flange 36 of the frame member 34 by means of a screw 111. The upper end of said plate has an offset 112 which is formed with a flange 113 secured to the end frame member 34 by means of a screw 114. The strip of bimetal 107 is further supported on a swinging mounting 115 which is constructed from sheet metal and which has ears 116 extending upwardly therefrom. A stud 117 extends through these ears and is attached to the end plate 109. This stud supports the mounting 115 for swinging movement. The mounting 115 has a guide 118 through which the strip of bimetal 107 extends. By swinging the mounting 115 the guide 118 can be raised and lowered to vary the elevation of one end of the strip of bimetal.

Attached to the end plate 109 is a stud 119. Rotatably mounted on this stud is a plate 120 which has a hub 121 secured thereto and forming a bearing through which the stud 119 extends. A nut 232 on the end of said stud holds the plate 120 in position. The plate 120 has attached to it a gear segment 122 which is formed with gear teeth 123. The teeth 123 are adapted to mesh with a rack 124 formed in the strip of bimetal 107 by means of openings 125. The segment 122 is attached to the plate 120 by means of rivets 126. The plate 120 is formed with a number of ratchet teeth 127 which form a ratchet indicated by its entirety by the numeral 128. These teeth are adapted to engage a catch 129. Catch 129 is pivoted on a stud 130 which is secured to the end plate 109. The catch 129 has a finger 131 which rests upon the strip of bimetal 107. A tension coil spring 132 is secured to the catch 129 on a pin 133 mounted thereon and also to a part carried by the end plate 109. This spring maintains the finger 131 in contact with the strip of bimetal 107 and also the catch 129 in engagement with the teeth 127. Below the strip of bimetal is mounted a heater 134 which serves to heat the strip of bimetal. When the bimetal is heated the same bows upwardly and the finger 131 is raised to disengage the catch 129 from the engaged tooth of the teeth 127. This causes the gear segment 122 to move and to shift the bimetal along to present a new section of the bimetal to be heated. The same procedure then reoccurs and the ratchet segment 128 is released one tooth at a time.

The timing device further includes a U-shaped arm 135 which has spaced flanges 136 and 137. A stud 138 extends through these flanges and is secured to the end plate 109. A clip 139 secured to said stud holds the arm 135 in position. The arm 135 has pivoted to it a depending latch 140. This latch is disposed between the flanges 136 and 137 and is mounted on a pintle 141 extending through said latch and flanges. The said latch has a catch 142 which is adapted to engage a catch engaging lever 143 pivotally mounted on a stud 144 secured to the end plate 109. The said lever has a shoulder 145 which engages the catch 142. The lever 143 has an arm 146 which is disposed oppositely to the shoulder 145 and which is adapted to engage an abutment 147 formed on a lever 148. Lever 148 is pivoted on a stud 149 which is secured to the end plate 109. The spring 132, previously referred to, is hooked on a hook 150 formed on the lever 148 and urges the abutment 147 into a position to be engaged by the arm 146. The plate 120 has a pin 151 secured thereto and which is adapted to engage the lever 148 and to swing the same in opposition to the action of the spring 132 and in a direction to disengage the abutment 147 from the arm 146. The pin 151 is so positioned that when the strip of bimetal 107 reaches the end of its movement pin 151 engages lever 148.

The arm 135 is urged upwardly by means of a torsion spring 152. This spring has a coil 153, the ends of which are indicated at 154 and 155. The end 154 of the said spring has a loop 156 which is looped about the pintle 141. The other end 155 of the said spring is offset and extends through a hole 157 in an arm 158. Arm 158 is pivotally mounted on a rivet 159 which is secured to the plate 120. The other end of said arm has a slot 160 in the same and through which passes a pin 161 secured to the latch 140. This spring urges the arm 135 upwardly and the pressure on the said arm increases as the ratchet 128 approaches the end of its movement.

For the purpose of moving the arm 135 into its latching position as shown in Fig. 5 a link 162 is employed. This link has a hook 163 which extends through a hole 164 in the lever 89. The upper end of said link has attached to it a stud 165 which has a shank 166 movable in a slot 167 formed in the latch 140. This slot is bananashaped in form and the shank 166 is adapted to move from one end to the other of said slot.

For the purpose of determining the brownness of the toast the color device H is employed. This device consists of a screw 168 which is screwed in a tapped lug 169 formed on the end plate 109. The said screw is further guided for rotational movement in another lug 170 formed on said plate. The screw 168 has a screw-driver slot in its lower end 171 by means of which the same may be rotated. The upper end of the screw 168 extends through an arm 172 formed on the mounting 115 and has a head 186 which engages the upper surface of said arm. This arm extends through the end plate 109 and upon movement swings the said mounting to vary the engagement of the teeth 127 of ratchet 128 with the catch 129. The said screw has mounted on it an arm 173. This arm is formed from resilient sheet metal and is threaded to receive the said screw. The said arm further has a spaced threaded portion 174 connected to it by a resilient connection 175. This connection provides friction between the threaded part of the arm and the threaded portion 174 whereby friction is created between the arm and the screw and the arm caused to travel with the screw. The arm 175 has pivoted to it by means of a rivet 176 a link 177. This link is in turn pivoted by means of a screw 178 to a lever 179. Lever 179 is disposed below the frame 32 and underlies the flanges 36. This lever is pivoted to a cross bar 180 by means of a screw 181. Cross bar 180 is secured to the flanges 27 by means of screws 182 as best shown in Fig. 1. The lever 179 extends through slots 183 in the end pieces 24 and projects outwardly beyond the same. To the extreme ends of this lever are attached knobs 184. The slots 183 have lateral extent and the lever 179 may be swung laterally about the pivot formed by the screw 181 from one side of the toaster to the other. This causes the arm 173 to be rotated a portion of revolution upon the swinging of the lever 179. Said lever raises and lowers the mounting 115 thus varying the degree of engagement of the catch 129 with the teeth 127 and consequently the brownness of the toast.

For operating the levers 88 and 89 two extensions 187 and 188 are employed. These extensions being identical in construction only the extension 187 will be described in detail. This extension consists of a body 189 which overlies the outermost end of lever 88. This body has a flange 190 extending at right angles to the body and formed with a hole not shown in the drawings and through which the lever 88 extends. The said body has a finger 191 which extends through a vertical slot 192 in the outermost end of said lever. A looped wire spring 193 extends about the flange 190 and is hooked under the lever 88 and also under the body 187. This spring urges the fingers 191 to the upper end of the slot 192. The body 187 has a bar 194 issuing therefrom and which extends through a vertical slot 195 in the end piece 24. Mounted on the end of the bar 194 is a knob 197. A set screw 196 holds the said knob attached to the bar. The purpose of the extension 177 is to compensate for various irregularities in the manufacture of the toaster. In a similar manner a knob 198 is attached to the extension 188 and which is mounted on the lever 89.

The switch mechanism G of the invention is best shown in Figs. 2 and 3. This switch mechanism includes a support 199 which is stamped from sheet metal and which has legs 200 projecting outwardly therefrom. These legs are attached to the end frame member 33 and hold the support 199 spaced from said end frame member. The lowermost part of this support 199 has flanges 201 projecting outwardly therefrom and which have attached to them a bar 202 of insulating material. Rivets 203 extend through these parts and hold the same attached. This bar of insulating material carries two fixed contacts 204 and 205 which are mounted on screws 206 and 207 which are secured to said bar. These contacts are connected in the circuit with the heating elements 51, 52, 53 and 54 in the usual manner. Pivoted to the support 199 is a lever 208 constructed of insulating material. This lever is mounted on a stud 209 secured to the support 199. A clip 210 attached to the end of this stud holds the said lever in position thereon. The lever 208 has an arm 211 which has pivoted to it by means of a rivet 212 a swinging contact bar 213. This bar has ears 214 extending upwardly therefrom and through which the rivet 212 extends. The said contact bar is also formed with movable contacts 215 which when the lever 208 is swung in a clockwise direction engage the contacts 204 and 205 and closes the circuit through the same. The lever 208 has at its other end an arm 216 which is formed with a slot 217. In this slot is received one end of compression coil spring 218, the other end of which encircles a lug 219 formed on a lever 220. Lever 220 is pivoted to the support 199 by means of a rivet 221. A link 223 is pivoted on a stud 222 which is secured to the end of the lever 220. This link has a headed end 224 which extends through the slot 104 in the lever 88 and in which the spring 103 is hooked. By means of this construction the arm 220 is connected to the lever 88. As the lever 88 descends lever 220 is moved downwardly and the spring 218 compressed. When the spring passes dead center with respect to the end of the slot 217 and the rivet 212 spring 218 moves over center and snaps contact bar 213 downwardly causing the contacts 215 to close the circuit through the contacts 205. The reverse occurs when the link 223 is moved upwardly. A clip 225 secured to the end of the stud 222 holds the link 223 mounted on said stud.

To retard the movement of the bread racks D to non-toasting position a dash pot 226 is employed. This dash pot is mounted on a bracket 227 issuing outwardly from the end plate 109. This dash pot has a piston 228 and to which is pivotally connected a connecting rod 229. This connecting rod is pivoted to a stud 230 secured to the plate 120. When the plate 120 is moved to normal position in the resetting of the toaster piston 228 is forced inwardly into the dash pot 226 and air leaking by the piston of the same retards the movement of the parts.

The operation of the invention is as follows: Normally the parts are arranged as shown in Figs. 1, 2, 3 and 4. Upon exerting pressure on either of the knobs 197 or 198 the corresponding lever 88 or 89 is moved downwardly. Due to the pintle 99 operating in the slot 98 both levers 88 and 89 are caused to simultaneously move downwardly. Lever 89 being connected to the arm 135 by means of link 162 and latch 140 the said arm is caused to swing downwardly with downward movement of said levers. The stud 165 on link 162 being in the lefthand end of the slot 167 as shown in Fig. 4 urges the latch 140 toward the right. As the latch descends said latch strikes the catch engaging lever 143 and moves the same downwardly. This causes the arm 146 to move upwardly and to shift the abutment 147 to the right as viewed in Fig. 4. Due to the spring 132 the said abutment yields to permit the arm 146 to engage the end of said abutment as shown in Fig. 5. When the latch 140 nears its lowermost position the catch 142 drops below the shoulder 145 of lever 143 and latches the lever 135 in the position shown in Fig. 5. At the same time lever 88 moves downwardly, the spring 218 passes dead center and snaps the contact bar 213 downwardly to close the circuit through the contacts 204 and 205. This energizes the heating elements 51, 52, 53 and 54 as well as the heater 134. The heater 134 now commences to bow the strip of bimetal 107 and when the finger 131 is sufficiently raised, catch 129 becomes disengaged from the first tooth of the teeth 127 of ratchet 128. Plate 120 now rotates in a counterclockwise direction slowly dragging with it the arm 158 and the connecting rod 229. As the heater 134 continues to function plate 120 is given a step by step movement until the pin 151 reaches the lever 143. This pin then swings the said lever in a clockwise direction and disengages the abutment 147 from engagement with the arm 146. This releases the latch 140 and spring 103 now moves lever 88 and through the levers 89, 84 and 83 and the link 100 the bread racks D upwardly. This resets the toaster to non-toasting position. When the plate 120 was at its opposite position to that illustrated in Fig. 5 just prior to release of the bread racks the arm 158 was in a downward position and pin 161 in the upper end of the slot 160 of said arm. Movement of the arm 135 upwardly moves arm 158 upwardly and the plate 120 is reset to the position shown in Fig. 4. If it is desired to manually release the toaster the same can be accomplished by pushing either of the levers 88 or 89 downwardly when in their position shown in Fig. 5. Normally when the levers are moved into toasting position stud 165 is in the lefthand end of the slot 167. When, however, the levers 88 or 89 are released stud 165 travels to the upper or righthand end of the slot 167 and occupies the position shown in Fig. 5. If one of the levers 88 or 89 is now depressed the stud 165 engages the latch 140 at the righthand end of the slot which has the effect of moving the catch 142 out of engagement with the shoulder 145. This releases the toaster and the parts are immediately moved into non-toasting position.

The advantages of the invention are manifest. The toaster is entirely automatic. The energizing of the toaster mechanism and the control of the color may be operated from either end of the toaster. With the operating mechanism utilized, the bread racks are rigidly supported. The lever system used for supporting the bread racks maintains the bread racks in horizontal position during their movement toward and from toasting position. With the crossed operating levers employed straight strips of metal may be utilized in the production of the same and economy in fabrication of the levers results. With the extensions on the ends of the operating levers, inaccuracies in the construction of the toaster are compensated for and the operating knobs brought up to normal position regardless of the positions of the operating levers. With the particular invention disclosed multiplication of movement of the bread racks is secured whereby limited downward movement of the operating knobs procures sufficient movement of the bread racks to bring them well within the bread ovens.

Changes in the specific form of the invention, as herein described, may be made within the scope of what is claimed without departing from the spirit of the invention.

Having described the invention, what is claimed as new and desired to be protected by Letters Patent is:

1. In a bread toaster a frame having first and second end frame members, spaced heating elements between said frame members and forming therewith a toasting oven with a space adjacent thereto, a bread rack in said oven, movable in an up and down direction from a toasting to a non-toasting position, said bread rack having a part extending through the first end frame member, attaching means disposed exteriorly of said first end frame member and connected to said part, spaced parallel levers pivoted to said attaching means and to said second frame member, a first operating lever pivoted to said first end frame member and extending through said second end frame member, a second operating lever pivoted to said second end frame member, and extending through said first end frame member, said operating levers crossing one another intermediate the ends thereof, guide means between said operating levers intermediate said end frame members for causing corresponding movement of said levers, and a link pivoted to one of said parallel levers at a locality intermediate the center thereof and the pivot therefor and further pivoted to one of said operating levers at a locality intermediate the center of said lever and the free end thereof.

2. In a bread toaster a frame having first and second end frame members, spaced heating elements between said frame members and forming therewith a toasting oven with a space adjacent thereto, a bread rack in said oven, movable in an up and down direction from a toasting to a non-toasting position, said bread rack having a part extending through the first end frame member, attaching means disposed exteriorly of said first end frame member and connected to said part, upper and lower spaced parallel levers pivoted to said attaching means and to said second frame member, a first operating lever pivoted to said first end frame member and extending through said second end frame member, a second operating lever pivoted to said second end frame member and extending through said first end frame member, said operating levers crossing one another intermediate the ends thereof, guide means between said operating levers intermediate said end frame members for causing corresponding movement of said levers and a link pivoted to the lowermost of the parallel levers at a locality intermediate the center thereof and the pivot therefor to said frame and further pivoted to said first operating lever at a locality intermediate the center of said lever and the pivoted end thereof.

3. In a bread toaster a frame having first and second end frame members, spaced heating elements between said frame members and forming therewith a toasting oven with a space adjacent thereto, a bread rack in said oven, movable in an up and down direction from a toasting to a non-toasting position, said bread rack having a part extending through the first end frame member, attaching means disposed exteriorly of said first end frame member and connected to said part, upper and lower spaced parallel levers pivoted to said attaching means and to said second end frame member, a first operating lever pivoted to said first end frame member and extending through said second end frame member, a second operating lever pivoted to said second end frame member and extending through said first end frame member, the pivots for said operating levers being of the same height, said operating levers crossing each other at a locality midway between said end frame members, guide means between said levers at the locality where said levers cross for causing corresponding movement of said levers and a link pivoted to the lowermost of the parallel levers at a locality intermediate the center thereof and the pivot therefor and further pivoted to said first operating lever at a locality intermediate the center of said lever and the pivoted end thereof.

4. In a bread toaster a frame having first and second end frame members, spaced heating elements between said frame members and forming therewith a toasting oven with a space adjacent thereto, a bread rack in said oven, movable in an up and down direction from a toasting to a non-toasting position, said bread rack having a part extending through the first end frame member, attaching means disposed exteriorly of said first end frame member and connected to said part, spaced parallel levers pivoted to said attaching means and to said second end frame member, a first operating lever pivoted to said first end frame member and extending through said second end frame member, a second operating lever pivoted to said second end frame member, and extending through said first end frame member, said operating levers crossing one another intermediate the ends thereof, guide means between said operating levers intermediate said end frame members for causing corresponding movement of said levers, and a link pivoted to one of said parallel levers and to one of said crossed levers and causing downward movement of said bread rack upon downward movement of said crossed levers.

HENRY L. OLSON.
HENRY J. FREEZE.

REFERENCES CITED

The following references are of record in the file of this patent:

UNITED STATES PATENTS

| Number | Name | Date |
|---|---|---|
| 2,091,041 | Hallwood | Aug. 24, 1937 |
| 2,106,824 | Bayne | Feb. 1, 1938 |
| 2,266,045 | Ireland | Dec. 16, 1941 |
| 2,288,699 | Gomersall et al. | July 7, 1942 |
| 2,365,909 | Sardeson | Dec. 26, 1944 |